March 8, 1927.  1,620,377
G. MILLWARD
AUTOMOBILE LADDER
Filed May 25, 1925
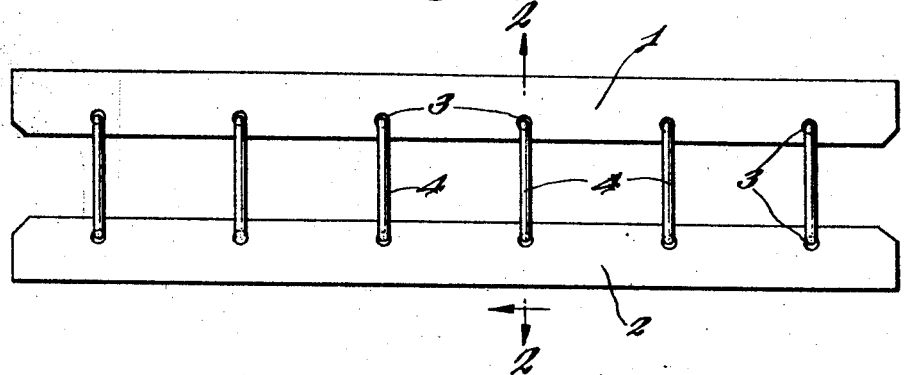
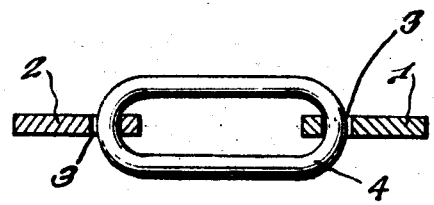
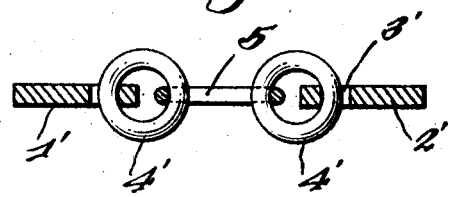
George Millward
INVENTOR
BY Victor J. Evans
ATTORNEY Patented Mar. 8, 1927.

1,620,377

UNITED STATES PATENT OFFICE.

GEORGE MILLWARD, OF MARQUETTE, MICHIGAN.

AUTOMOBILE LADDER.

Application filed May 25, 1925. Serial No. 32,773.

This invention relates to new and useful improvements in track devices and more particularly to what will be hereinafter known as a motor vehicle ladder. The main object of my invention is the provision of a device of the above character whereby to facilitate the removal of a motor vehicle from mud holes, loose sand and the like with very little effort.

Another object of my invention is the provision of a device of the above character which is so constructed and arranged that it may be folded longitudinally into a compact form as to occupy a minimum space with regard to being carried about.

With the above and other objects in view my invention consists in the novel features of construction and the combination of parts to be hereinafter more fully described, pointed out in the claims and shown in the accompanying drawings, in which:

Fig. 1 is a top plan view of an automobile ladder constructed in accordance with my invention, Fig. 2 is a transverse section on the line 2—2 of Fig. 1, and Fig. 3 is a transverse section illustrating a slightly modified form of the invention.

My improved traction device comprises spaced parallel side plates 1 and 2 each provided with spaced openings 3 along their inner longitudinal edges, the openings in one plate being arranged directly opposite the openings in the other plate and loosely mounted in these openings are the links 4 which connect the plates and form an anti-skid track for a motor vehicle wheel. Attention is directed to the fact that the links 4 are loosely mounted within the openings 3 so that when the plates 1 and 2 are positioned beneath the motor vehicle wheel, the links 4 will be moved to an angle relative to the plates 1 and 2 to provide a suitable tread surface for the vehicle wheel.

It will be apparent from the foregoing that when the traction wheels of a motor vehicle have become engaged in a mud hole, soft sand or the like, the device is placed in position so that the ends of the plates of the same will be disposed upon opposite sides of the vehicle wheel whereby the links 4 will serve as an anti-skid track for the vehicle wheel whereby the wheel will engage the links and through movement of the wheel will ride over the same onto solid foundation.

In Figure 3 I have illustrated a slightly modified form of the invention wherein the plates 1' and 2' are provided with the openings 3' and each plate has arranged in its openings an attaching ring 4' with the attaching rings 4' connected by means of the links 5, the links 5 being operatively disposed in a plane parallel with the plates 1' and 2' and forming an anti-skid track for the vehicle wheel. This form of the invention is placed in operative position the same as the preferred form.

It will be apparent from the foregoing that I have provided a simple and inexpensive device for motor vehicles wherein the side plates may be readily folded upon each other so that the device may occupy a minimum space when not in use.

While I have shown and described the preferred form of my invention it will be obvious that various changes in the details of construction and in the proportions without sacrificing any of the novel features may be resorted to for successfully carrying my inventions into practice without departing from the scope of the appended claims.

Having thus described my invention, what I claim is:

1. A device of the character described, including spaced parallel plate members having openings in their inner edges, links loosely engaged with said openings and adapted to span the distance between the said plates whereby to form an anti-skid trackway for vehicle wheels.

2. A device of the character described including spaced parallel plate members having spaced openings in their inner longitudinal edges, links loosely engaged through said openings and connecting said plates whereby to form an anti-skid trackway for vehicle wheels, said links permitting the plates to be disposed closely adjacent each other for storage purposes when the device is not in use.

3. A device of the character described including spaced parallel plate members having spaced openings in their inner longitudinal edges, means loosely engaged through said openings and connecting said plates to form an anti-skid trackway for vehicle wheels, said means permitting the plates to be disposed closely adjacent each other for storage purposes when the device is not in use.

In testimony whereof I affix my signature.

GEORGE MILLWARD.